(12) United States Patent
Kleinschmidt

(10) Patent No.: US 6,522,681 B1
(45) Date of Patent: Feb. 18, 2003

(54) LASER FOR THE GENERATION OF NARROW BAND RADIATION

(75) Inventor: Jürgern Kleinschmidt, Weissenfels (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/534,096

(22) Filed: Mar. 23, 2000

(30) Foreign Application Priority Data

Apr. 26, 1999 (DE) .................... 299 07 349 U

(51) Int. Cl.[7] .............................. H01S 3/10; H01S 3/08

(52) U.S. Cl. ..................... 372/108; 372/20; 372/101; 372/102; 372/100

(58) Field of Search ................. 372/100–102, 372/20, 25, 108

(56) References Cited

U.S. PATENT DOCUMENTS

| | | | |
|---|---|---|---|
| 3,471,800 A | 10/1969 | Congleton et al. | 331/94.5 |
| 3,546,622 A | 12/1970 | Peterson et al. | 331/94.5 |
| 3,609,586 A | 9/1971 | Danielmeyer et al. | 331/94.5 |

(List continued on next page.)

FOREIGN PATENT DOCUMENTS

| | | | |
|---|---|---|---|
| DE | 29822090.3 | 2/1991 | H01S/3/08 |
| DE | 298 22 090 U 1 | 3/1999 | H01S/3/08 |
| DE | 299 07 349 U 1 | 8/2000 | H01S/3/086 |
| EP | 1 041 689 A1 | 10/2000 | H01S/3/1055 |
| EP | 1 102 368 A2 | 5/2001 | H01S/3/081 |
| EP | 1 119 083 A2 | 7/2001 | H01S/3/08 |
| JP | 60 16479 | 1/1985 | H01S/3/081 |
| JP | 8 274399 | 11/1986 | H04S/3/104 |
| JP | 62 160783 | 7/1987 | H01S/3/115 |
| JP | 2 152288 | 6/1990 | H01S/3/106 |

OTHER PUBLICATIONS

Finkelstein et al., "A Rectilinear Transmission Grating and Applications," *JOSA*, vol. 43., 1953., pp. 335.
Watts, J.K., "Theory of Multiplate Resonant Reflectors," *Applied Optics*, Aug. 1968, vol. 7, No. 8., pp. 1521–1523.
M. Born, et al., Principles of Optics, at page 325, Pergamon, 1970.
Bloom, A.L., "Modes of a Laser Resonator Containing Tilted Birefringent Plates," *Journal of the Optical Society of America*, vol. 64, No. 4, Apr. 1974.
Okada, M., et al., "Electronic Tunig of Dye Lasers by an Electrooptic Birefringent Fabry–Perot Etalon," *Optics Communications*, vol. 14, No. 1, May 1975.
Rice, J.K., "VUV Emissions from Mixtures of F2 and the Noble Gasses—A Molecular F2 laser at 1575 Aa)," *Applied Physics Letters*, vol. 31, No. 1, Jul. 1, 1977.
Saika, S., "Nitrogen–Laser–Pumped Single–Mode Dye Laser," *Applied Physics*, 1978.

(List continued on next page.)

*Primary Examiner*—Paul Ip
*Assistant Examiner*—Armando Rodriguez
(74) *Attorney, Agent, or Firm*—Sierra Patent Group, Ltd.; Andrew V. Smith

(57) ABSTRACT

A laser is disclosed for generating radiation having narrow band width and high spectral purity. The laser comprises a cavity (10) containing a lasing medium (12) in between two reflective elements (14, 16) and at least one wavelength-selective element (16) for extracting (coupling-out) radiation from the resonator. In one embodiment, said element for extracting radiation from the resonator comprises a prism (30; 60; 70) which is wavelength-selective on the basis of interference. According to another embodiment, the element (16') for extracting radiation from the resonator comprises two transparent plates (40, 42) each of which is, at one side, partly reflective. According to another embodiment, said wavelength-selective element (50, 52) for extracting radiation from the resonator comprises an angled mirror (50) and a plate (52) arranged in front of that mirror.

15 Claims, 2 Drawing Sheets

U.S. PATENT DOCUMENTS

Figure 1:
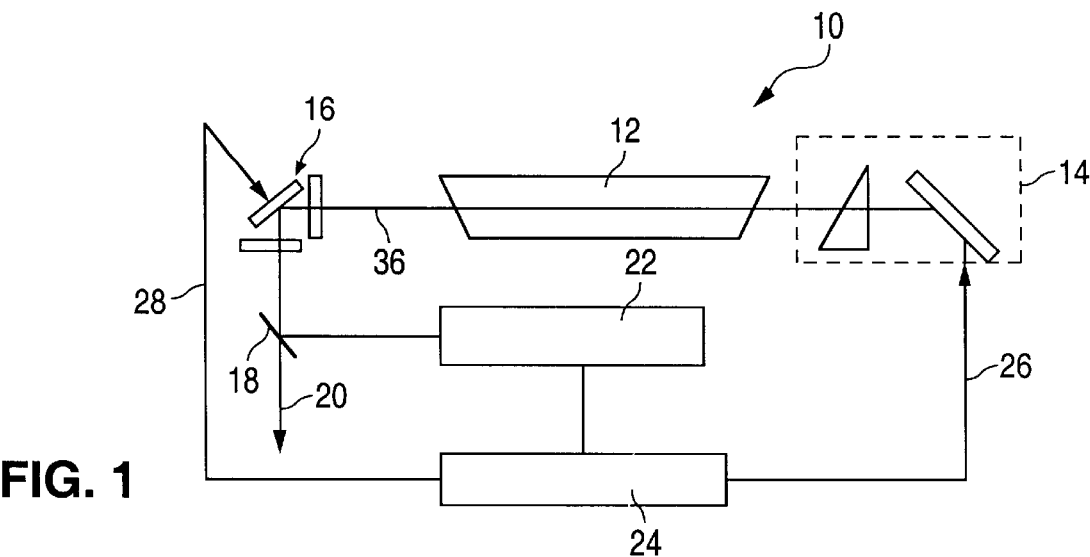

| Patent No. | Date | Inventor | Class |
|---|---|---|---|
| 3,609,856 A | 10/1971 | Eckert | 29/473.1 |
| 3,868,592 A | 2/1975 | Yarborough et al. | 331/94.5 |
| 4,393,505 A | 7/1983 | Fahlen | 372/57 |
| 4,399,540 A | 8/1983 | Bucher | 372/28 |
| 4,611,270 A | 9/1986 | Klauminzer et al. | 364/183 |
| 4,616,908 A | 10/1986 | King | 350/576 |
| 4,691,322 A | 9/1987 | Nozue et al. | 372/82 |
| 4,696,012 A | 9/1987 | Harshaw | 372/99 |
| 4,803,696 A | 2/1989 | Pepper et al. | 372/95 |
| 4,829,536 A | 5/1989 | Kajiyama et al. | 372/57 |
| 4,856,018 A | 8/1989 | Nozue et al. | 372/98 |
| 4,860,300 A | 8/1989 | Baumler et al. | 372/57 |
| 4,873,692 A | 10/1989 | Johnson et al. | 372/20 |
| 4,905,243 A | 2/1990 | Lokai et al. | 372/32 |
| 4,926,428 A | 5/1990 | Kajiyama et al. | 372/20 |
| 4,972,429 A | 11/1990 | Herbst | 372/100 |
| 4,975,919 A | 12/1990 | Amada et al. | 372/33 |
| 4,977,563 A | 12/1990 | Nakatani et al. | 372/32 |
| 5,025,445 A | 6/1991 | Anderson et al. | 372/20 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,221,823 A | 6/1993 | Usui | 219/121.78 |
| 5,226,050 A | 7/1993 | Burghardt | 372/20 |
| 5,337,330 A | 8/1994 | Larson | 372/86 |
| 5,373,515 A | 12/1994 | Wakabayashi et al. | 372/20 |
| 5,396,514 A | 3/1995 | Voss | 372/57 |
| 5,404,366 A | 4/1995 | Wakabayashi et al. | 372/29 |
| 5,406,571 A | 4/1995 | Bucker et al. | 372/20 |
| 5,440,574 A | 8/1995 | Sobottke et al. | 372/34 |
| 5,440,578 A | 8/1995 | Sandstrom | 372/59 |
| 5,450,207 A | 9/1995 | Fomenkov | 356/416 |
| 5,479,431 A | 12/1995 | Sobottke et al. | 372/34 |
| 5,532,880 A | 7/1996 | Robb | 359/665 |
| 5,535,233 A | 7/1996 | Mizoguchi et al. | 372/87 |
| 5,557,629 A | 9/1996 | Mizoguchi et al. | 372/87 |
| 5,559,584 A | 9/1996 | Miyaji et al. | 355/73 |
| 5,559,816 A | 9/1996 | Basting et al. | 372/27 |
| 5,596,456 A | 1/1997 | Luecke | 359/831 |
| 5,596,596 A | 1/1997 | Wakabayashi et al. | 372/102 |
| 5,625,499 A | 4/1997 | Chen | 359/831 |
| 5,646,954 A | 7/1997 | Das et al. | 372/55 |
| 5,652,681 A | 7/1997 | Chen et al. | 359/831 |
| 5,659,419 A | 8/1997 | Lokai et al. | 359/330 |
| 5,663,973 A | 9/1997 | Stamm et al. | 372/20 |
| 5,684,822 A | 11/1997 | Partlo | 372/95 |
| 5,729,562 A | 3/1998 | Birx et al. | 372/38 |
| 5,729,565 A | 3/1998 | Meller et al. | 372/87 |
| 5,761,236 A | 6/1998 | Kleinschmidt et al. | 372/100 |
| 5,763,855 A | 6/1998 | Shioji | 219/121.84 |
| 5,802,094 A | 9/1998 | Wakabayashi et al. | 372/57 |
| 5,811,753 A | 9/1998 | Weick et al. | 219/121.78 |
| 5,818,865 A | 10/1998 | Watson et al. | 372/86 |
| 5,835,520 A | 11/1998 | Das et al. | 372/57 |
| 5,852,627 A * | 12/1998 | Ershov | 372/108 |
| 5,856,991 A | 1/1999 | Ershov | 372/57 |
| 5,898,725 A | 4/1999 | Fomenkov et al. | 372/102 |
| 5,901,163 A | 5/1999 | Ershov | 372/50 |
| 5,914,974 A | 6/1999 | Partlo et al. | 372/38 |
| 5,917,849 A | 6/1999 | Ershov | 372/102 |
| 5,936,988 A | 8/1999 | Partlo et al. | 372/38 |
| 5,940,421 A | 8/1999 | Partlo et al. | 372/38 |
| 5,946,337 A | 8/1999 | Govorkov et al. | 372/92 |
| 5,949,806 A | 9/1999 | Ness et al. | 372/38 |
| 5,970,082 A | 10/1999 | Ershov | 372/102 |
| 5,978,346 A | 11/1999 | Mizuno et al. | 369/112 |
| 5,978,391 A | 11/1999 | Das et al. | 372/20 |
| 5,978,394 A | 11/1999 | Newman et al. | 372/32 |
| 5,978,409 A | 11/1999 | Das et al. | 372/100 |
| 5,982,795 A | 11/1999 | Rothweil et al. | 372/38 |
| 5,982,800 A | 11/1999 | Ishihara et al. | 372/57 |
| 5,991,324 A | 11/1999 | Knowles et al. | 372/57 |
| 5,999,318 A | 12/1999 | Morton et al. | 359/572 |
| 6,005,880 A | 12/1999 | Basting et al. | 372/38 |
| 6,014,206 A | 1/2000 | Basting et al. | 356/138 |
| 6,014,398 A | 1/2000 | Hofmann et al. | 372/60 |
| 6,016,479 A | 1/2000 | Taricani, Jr. | 705/19 |
| 6,018,537 A | 1/2000 | Hofmann et al. | 372/25 |
| 6,020,723 A | 2/2000 | Desor et al. | 320/166 |
| 6,028,872 A | 2/2000 | Partlo et al. | 372/38 |
| 6,028,879 A | 2/2000 | Ershov | 372/57 |
| 6,028,880 A | 2/2000 | Carlesi et al. | 372/58 |
| 6,061,382 A | 5/2000 | Govorkov et al. | 372/101 |
| 6,128,323 A | 10/2000 | Myers et al. | 372/38 |
| 6,137,821 A | 10/2000 | Ershov | 372/108 |
| 6,154,470 A | 11/2000 | Basting et al. | 372/19 |
| 6,240,110 B1 * | 5/2001 | Ershov | 372/20 |

OTHER PUBLICATIONS

Woodworth, J.R., ete al., "An Efficient, High Power F2 Laser Near 157 nma)," *The Journal of Chemical Physics*, vol. 69, Sep. 15, 1978.

S. Sumida, et al., "Novel Neutral Atomic Fluorine Laser Lines in a High–pressure Mixture of F2 and He," *Journal of Applied Physics*, vol. 50, No. 6, Jun. 1979.

Pummer, H., et al., "Discharge Pumped F2 Laser at 1580 A", *Optics Communications*, vol. 28, No. 1, Jan. 1979.

Hohla, K., et al., "ClF and F2: Two New Ultra–violet Laser Systems," *Optics and Laser Technology*, vol. 11, No. 6, Dec. 1979.

Hutchinson, M.H.R., "Vacuum Ultraviolet Excimer Lasers," *Applied Optics VUV VI*, vol. 19, No. 23, Dec. 1, 1980, pp. 3883–3888.

R. Sadighi–Bonabi, et al., "Gain and Saturation of the Atomic Fluorine Laser," *Journal of Applied Physics*, vol. 53, No. 5, May 1982.

S. Marcus, "Cavity Dumping and Coupling Modulation of an Etalon–Coupled CO2 Laser," *J. Appl. Phys.*, vol. 63, No. 9, Sep. 1982.

Koprinkov, I.G., et al., "Intense Laser Generation from an Atomic–Fluorine," *Applied Physics*, vol. B33, No. 4, Apr. 1984.

A.C. Cefalas, et al., "Gain Measurements at 157 nm in an F2 Pulsed Discharge Molecular Laser," *Optics Communications*, vol. 55, No. 6, Oct. 15, 1985.

E. Armandillo, et al., "Simple, Compact, High–repetition Rate XeCl Laser," *Review of Scientific Instruments*, vol. 56, No. 5, Part 1, May 1985.

McKee, T., "Spectral–narrowing Techniques for Excimer Laser Oscillators," *Can J Phys*, 1985, vol. 63., pp. 214–219.

V.N. Ishchenko, et al., "High–power Efficient Vacuum Ultra–violet F2 Laser Excited by an Electric Discharge," *Soviet Journal of Quantum Electronics*, vol. 16, No. 5, May 1986.

ZOS, Akademie der Wissenschaften der DDR, Zentralinstitut fur Optik und Wissenschaften der DDR, Oktober 1987, "Leistungastarker atomarer Fluorlaser im roten Spektralbereich," Jurgen Lademann, Roland Kunig, Wadim Saidow, Rainer Weidauer.

H. Lengfellner, et al., "Generation of Tunable Pulsed Microwave Radiation by Nonlinear Interaction of Nd:YAG Laser Radiation in GaP Crystals," *Optics Letters*, vol. 12, No. 3, Mar. 1987.

Wani, K., et al., Narrow–band KrF Excimer Laser—Tunable and Wavelength Stabilized, *SPIE—The International Society for Optical Engineering, Excimer Beam Applications*, vol. 998, Sep. 1988, Boston, Massachusetts.

Uematsu, T, et al., "Theoretical Simulation of a Discharge–pumped F2 Excimer Laser," *Discharge–Pumped Excimer Laser Research in Japan,* Apr. 1988.

McKee, T.J., et al., "Line–narrowed Industrial Excimer Laser for Microlithography," *Conference on Lasers and Electro–Optics, 1989 Technical Digest Series,* vol. 11, Apr. 24–29, 1989, Baltimore, Maryland.

Yamada, K., et al., "High Power Discharge–pumped F2 Laser," *Lasers and Electro–Optics Society Annual Meeting Conference Proceedings, Leos '89,* Oct. 17–20, 1989.

Yamada, K., et al., "High–power Discharge–pumped F2 Molecular Laser," *Applied Physics Letters,* vol. 54, vol. 7, Feb. 13, 1989.

Wataru Sasaki, et al., "Intense VUV–XUX Generation from Rare Gas Excimers," *Conference on Lasers and Electro–Optics, 1989, Technical Digest Series,* vol. 11, May 24–28, 1989.

Shaw, "Excimer Laser Resonator," Shaw, "Excimer Laser Resonator," *Physics and Technology of Laser Resonators,* Bristol New York, 1989, pp. 244–245.

Magni, Resonator with Variable Reflectivity Mirrors, in Shaw, at pp. 94–105.

Science Report, Lambda Physik, No. 3, Nov. 1990, "Breakthrough in F2 Laser Technology" pp. 1–4.

F. Voss, "Optimierung der VUV–Emission bei 157 nm (F2–Linie) bei Entladungs—gepemten Excimerlasern," *Verhanlungen,* Mar. 1990, Physikertagung Muchen 1990., pp. 450–451.

Kakehata, M., "High Specific Output Energy Operation of a Vacuum Ultraviolet Molecular Fluorine Laser Excited at 66 NW/cm3 by an Electric Discharge," *Applied Physics Letters,* vol. 56, No. 26.

Kakehata, M., et al., "Frequency up–conversion of a Discharge Pumped Molecular Fluorine Laser by Stimulated Raman Scattering in H2," *Gas Flow and Chemical Lasers, SPIE,* vol. 1397, Sep. 10–14, 1990.

K. Komatsu, et al., "Spectroscopic Comparison Between Low and High Pressure Discharge Pumped Xe Atomic Lasers," *Conference on Lasers and Electro–optics, 1990 Technical Digest Series,* vol. 7, May 21–25, 1990.

C. Skordoulis, et al., "Amplification Characteristics of a Discharge Excited F2 Laser," *Journal of Modern Optics,* vol. 37, No. 4, Apr. 1990.

Traub, W., "Constant–dispersion Grism Spectrometer for Channeled Spectra," *Optical Society of America,* Sep. 1990, vol. 7., No. 9., pp. 1779–1791.

Highlights, Lambda Physik, No. 29, Jun. 1991, "VUV Spectroscopy by Frequency Trippling" pp. 1–6.

Momma, C., "Stimulated Raman Scattering of a F2–Laser in H2," *Institut Fur Quantenopik,* Oct. 22, 1991.

Tagungsband, Vom. 24, Bis. 26, Sep. 1991, Abstract: "Vakuum UV Molekullaser mit hoher Ausgangsleistung" 3 pages.

Kakehata, M., "Efficency Characterization of Vacuum Ultraviolet Molecular Fluorine (F2) Laser (157nm) Excited by an Intense Electric Discharge," *IEEE Journal of Quantum Electronics,* Nov. 1991, vol. 27, No. 11.

Highlights, Lambda Physik, No. 33, Feb. 1992, "VUV Strokes and Anti–Stokes Raman Lines Derived from an F2 Laser" 5 pages.

S.M. Hooker, et al., "Influence of Cavity Configuration on the Pulse Energy of a High–Pressure Molecular Fluorine Laser," *Applied Physics B Photo–physics and Laser Chemistry,* vol. 1, 1992.

Bastiaens, H.M.J., et al., "Small–signal Gain Measurements in an Electron Beam Pumped F2 Laser," *Applied Physics Letters,* vol. 63, No. 4, Jul. 26, 1993.

Highlights Lambda Physik, Apr. 1993, "Excimer Laser Based Microstructuring Using Mask Projection Technique," U. Sarbach.

High Power Laser & Particle Beams, vol. 6, No. 4, Series No. 24, Nov. 15, 1994, 12 pages in Japanese.

Highlights, Lambda Physik, No. 43, Jan. 1994, "Photochemical Modification of Fluorocarbon Resin to Generate Adhesive Properties" pp. 1–6.

F.T.J.L. Lankhorst, et al., "Long Pulse Electron Beam Pumped Molecular F2–Laser," *Journal of Applied Physics,* vol. 77, Jan. 1–15, 1995.

Demtroder, W., Laser Spectroscopy Springer, *Berlin Heidelberg,* 1996, pp. 99–221.

Ohwa, M., "Theoretical Evaluation of High–effiency Operation of a Discharge–pumped Vacuum–ultraviolet F2 Lasers," *Applied Optics Letters,* vol. 51, No. 13, Sep. 28, 1997.

Kitamura, et al., "Small–signal Gain Measurements in a Discharge–pumped F2 Laser," *Journal of Applied Physics,* vol. 81, No. 6, Mar. 1997, pp. 2523–2528.

Giuri, et al., "Output Coupler Design of Unstable Cavities for Excimer Lasers," *Optics,* 1997, 1143–1148.

Hultzsch, R., "Gitterprismen," *Photonik,* Sep. 1998., pp. 40–41. This publication is in German.

Geyer et al., Double Gratings–Prism, *Astr. Astraphys.,* vol. 148., pp. 312–316, 1985.

Kakehata, M. et al., "CTUH15 Experimental Study of Tunability of a Discharge Pumped Molecular Fluorine Laser," *CLEO 90/Tuesday Poster,* pp. 106–108, 1990.

D. Basting, et al., "Processing of PTFE with High Power VUV Laser Radiation".

* cited by examiner

LASER FOR THE GENERATION OF NARROW BAND RADIATION

The invention relates to a laser for the generation of narrow band radiation of high spectral purity comprising a laser resonator which includes two reflective elements and a laser active medium placed between them, at least one wavelength selective element and a wavelength selective outcoupling device for outcoupling the radiation from the laser resonator.

Such a laser is known from U.S. Pat. No. 5,856,991 (Ershov). The excimer laser described therein comprises a grid placed in the resonator as the wavelength selective element and an etalon as the wavelength selective outcoupling device for coupling out the radiation from the laser resonator.

The invention is concerned with the problem of with a laser of that kind generating highly stable narrow band radiation as with a band width narrow as possible. This is especially important in photolithographical applications for the production of integrated circuits. For this purpose wavelengths of <250 nm are required to create structures in dimensions <0,25 $\mu$m (for structures in dimensions <0, 18 $\mu$m wavelengths of <200 nm are required). In such spectral ranges achromatically imaging optics can hardly be produced. Therefore, the radiation used must be very narrow banded in order to keep imaging distortions caused by chromatic aberrations to a minimum. In the field of photolithography, which is a particular concern of this invention, band widths in the range of <0,6 pm are acceptable for refractive imaging optics.

In such applications of laser radiation another important radiation property is the so-called spectral purity (also called "95% integral"). The spectral purity of the radiation is indicated, for example, by that wavelength interval within which 95% of the total pulse energy lies.

In the state of the art varied attempts to improve both, the band width and the spectral purity are known.

One such attempt for the improvement of spectral purity is the realization that the so-called wave front curvature has a substantial influence on the band width and especially on the spectral purity of the laser radiation released. The German Gebrauchsmuster (petty patent) 298 22 090 describes lasers in which such a wave front curvature is corrected.

A further attempt for the improvement of the band width and the spectral purity is pursued in the U.S. Pat. No. 5,150,370 (Furuya et al.) and U.S. Pat. No. 5,559,816 (Basting und Kleinschmidt). Therein, two polarization coupled resonators are proposed with the main light generation taking place in a primary resonator and the wavelength selection being performed by means of a etalon, which is arranged in a secondary resonator with relatively low radiation power. The U.S. Pat. No. 5,835,520 (Palash et al.) and U.S. Pat. No. 5,150,370 (Furuya et al.) also describe arrangements in which the wavelength selective units are positioned on one side of the laser active medium.

The U.S. Pat. Nos. 5,852,627 and 5,856,991 (Ershov) as well as U.S. Pat. No. 5,559,816 (Basting et al.) open the possibility for arranging wavelength selective elements on both sides of the active medium.

The object of the invention is to improve with simple and reliable means a laser with respect to the band width of the radiation emitted as well as the spectral purity of same.

In accordance with the invention this object is achieved by a wavelength selective outcoupling device in the shape of a prism or the like.

According to a first variant a prism in a more specific sense is arranged so that the laser radiation emitted from the resonator impignes (especially perpendicularly) on one side of an isosceles prism, is reflected on the base surface and emerges on the other isosceles side of the prism(especially rectangularly to the surface). Thereby reflections with degrees of reflectance of a view percent, e. g. 4%, (so-called Fresnel reflections) occur on the uncoated surfaces of the isosceles prism resulting in a so-called two-beam-interference with a determined free spectral range and, therefore, a reduced band width and an improved spectral purity.

It is not required for the "prism" in the meaning of the present invention to be in a more specific sense a massive body of glass with a triangular cross section. According to a variant of the invention the wavelength selective outcoupling device shows two transparent plates arranged so that they are angled towards one another like a prism, whereby the passing radiation is reflected on a mirror arranged in the radiation path between the plates.

According to a further variant of the invention the wavelength sensitive outcoupling device shows an angular mirror with a plate arranged in front of it, whereby two interfering beams occur by means of a partial reflection on the plate.

Preferred embodiments of the laser according to the invention are described in the dependant claims.

The invention is based on the principle that dual beam or multiple beam interferences are generated by an angular arrangement of partially reflective surfaces and mirrors, which react on the laser resonator so that both, a wavelength selection and an improvement of the spectral purity are achieved.

The prism like arrangement of the elements as provided by the invention represents a "generalized" structure for the generation of two-beam or multiple beam interferences. The third reflective surface, additionally arranged in the radiation path according to the invention, offers (other than an etalon) the possibility of wavelength-tuning due to additional physical effects, such as, for example, phase variation of the reflectivity by means of controlled total reflection.

The solutions as provided by the invention further offer the advantage, that in the prism like arrangement the two reflective surfaces which cause the dual beam or multiple beam interferences are not moved themselves. With an etalon (U.S. Pat. No. 5,856,991) it is required to move at least one etalon mirror for the wavelength tuning.

The invention is especially suitable to be realized with an excimer laser, for example, a KrF excimer laser or a $F_2$ laser.

Figure 2:
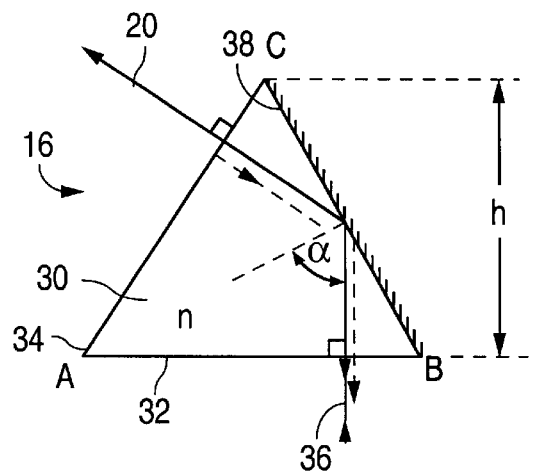
Figure 3:
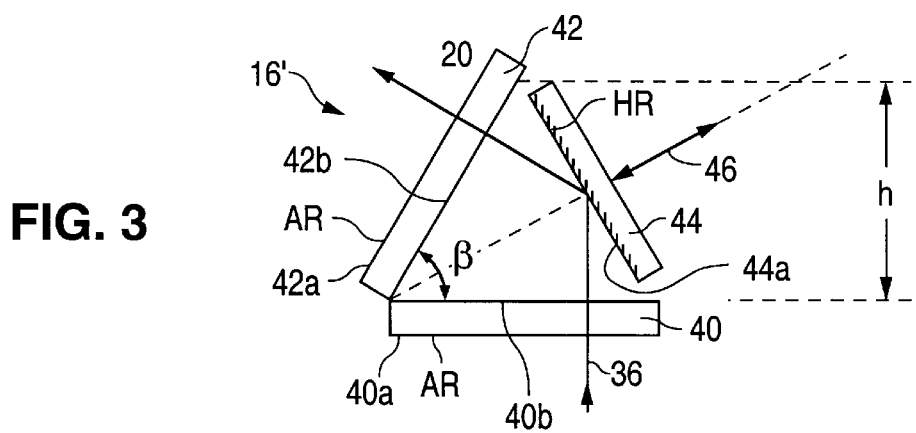
Figure 4:
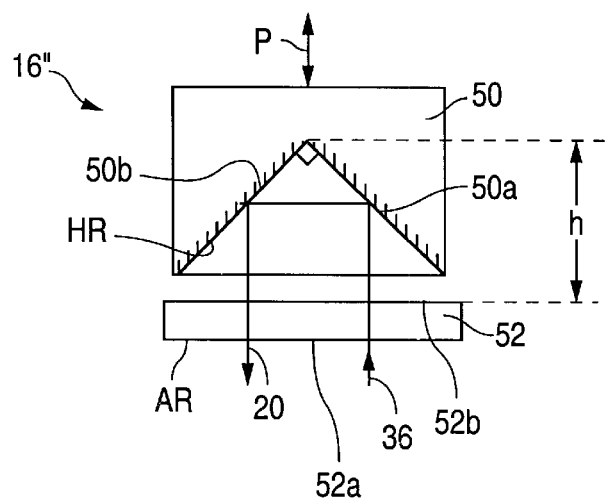
Figure 5:
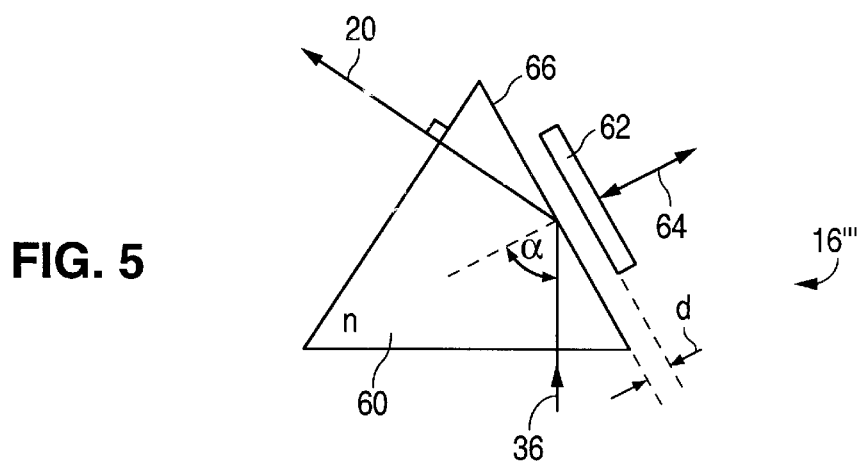
Figure 6:
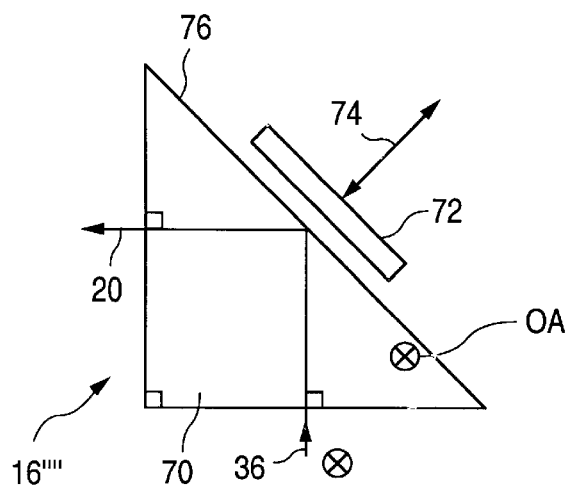

Hereinafter, examples of embodiments of the invention are explained in detail with reference to the drawings. Shown is in:

FIG. 1 a schematic depiction of the total arrangement of a laser with a wavelength selective outcoupling device FIG. 2 a schematic depiction of the principle of the wavelength selective outcoupling of the radiation emitted from the laser resonator according to the invention FIG. 3 a further embodiment of a wavelength selective outcoupling device FIG. 4 a further embodiment of a wavelength selective outcoupling device FIG. 5 a further embodiment of a wavelength selective outcoupling device, and FIG. 6 a variation of the wavelength selective outcoupling device according to FIG. 5

FIG. 1 shows a laser resonator 10 with a laser active medium 12, a wavelength selective element 14 and a outcoupling device 16 for coupling radiation 20 out of the laser resonator 10. This may, for example, be an excimer laser (e. g. KrF) using a grid as the wavelength selective element 14.

As described in more detail further below, the outcoupled laser radiation 20 is improved as to both, its band width and spectral purity with respect to above-mentioned requirements. The laser radiation passes a partially transmirror 18 and a small portion of the radiation is fed to a wavelength measuring device 22, the measuring results of which are transmitted to a control unit 24. The control unit 24 controls via control signals 26 and 28, respectively, the wavelength selective element 14 (e. g. the grid) as well as the wavelength selective outcoupling device 16, with several embodiments of the latter being described hereinafter.

FIG. 2 schematically shows for explanation the general principle and a first example of a wavelength selective outcoupling device according to the invention. A prism 30 shows isosceles lateral faces 32 and 34, i. e. the section AB equals the section AC. For instance, $CaF_2$ may be chosen as the material for the prism.

The angle of incidence of the beam onto the base surface BC of the prism 30 may be assumed to be $\alpha$. If $\alpha<\theta=\arcsin(1/n)$ (wherein $\theta$ identifies the angle of the total reflection and n identifies the refractive index), then the surface CB has to be coated accordingly in order to be reflective, i. e. it has to have a highly reflective coating (HR). If the angle $\alpha>\theta$, total reflection takes place, even if the surface CB does not have highly reflective coating on it. The surfaces 32, 34 (i. e. AB and AC) are uncoated, for which reason only a so-called Fresnel reflection with degrees of reflectance of a view percent, i. e. 4%, occurs.

In FIG. 2 the laser beam 36 ((see also FIG. 1) arrives from below, impignes on and penetrates the surface 32 rectangularly, enters the prism 30 and is completely reflected from the base surface BC as shown by the solid line. Then the beam exits the isosceles prism 30 (equal legs 32, 34) by penetrating the second surface 34 rectangularly. The emerging beam is marked with reference 20 (see also FIG. 1). As mentioned before, a small portion of the radiation is reflected from the uncoated surface 34. In FIG. 2 this is indicated by the broken line. As a result a two-beam-interference occurs. The free spectral range FSR is given as $FSR=\lambda^2/(2\,nh)$. In order to achieve a free spectral range FSR of 2 pm at a wavelength of $\lambda$=248 nm and at a refractive index n of 1,5, the height h (FIG. 2) of the prism 30 is required to be in the range of 10 mm.

FIG. 3 shows a modified embodiment of a wavelength selective outcoupling device 16, which fits respectively, as well as the embodiments described hereinafter, in a laser according to FIG. 1 instead of the outcoupling device 16. The resonator radiation entering the outcoupling device is identified with reference 36 in all figures and the radiation emerging from the outcoupling device (i. e. the "outcoupled" laser radiation) is identified with reference 20.

In the embodiment according to FIG. 3 two transparent plates 40, 42 are arranged angling towards one another at an angle of $\beta$. A highly reflective mirror 44 with a highly reflective (HR) front surface (44$a$) stands perpendicular to the bisecting line of the angle $\beta$.

The outer surfaces 40$a$ and 42$a$, respectively, of the two transparent plates 40 and 42, respectively, are coated anti-reflective (AR), i. e. non-reflective. Partial reflection of the radiation (the Fresnel reflection mentioned above) with reflection coefficients in the order of a view percent occur, therefore, only on the inner surfaces 40$b$ and 42$b$, respectively, of the transparent plates 40 and 42, respectively. As a result the two-beam-interference occurs, as already described with reference to FIG. 2. The two transparent plates 40, 42 may be made of $CaF_2$ or $MgF_2$. Tuning of the wavelength is achieved by moving the mirror 44 in the direction of the double headed arrow 46. The mirror 44 is, for example, movable in the required manner by very small stretches by means of a piezoelectric crystal. During this the position of mirror 44 remains perpendicular to the bisecting line of the angle $\beta$. The accruing free spectral range (FSR) is $\lambda^2/(2\,nh)$. An angle $\beta$=90° is to be regarded as a special case (this case is schematically shown in FIG. 1).

FIG. 4 shows a further embodiment of a wavelength selective outcoupling device 16". Herein, a plate 52, e. g. made of $CaF_2$ or $Mg\,F_2$, is coated anti reflective on its outer surface 52$a$ and the resonator radiation 36 penetrates the plate 52 perpendicularly (arriving from below in FIG. 4).A mirror 50 with two angular and highly reflective surfaces 50$a$, 50$b$ is arranged behind the plate 52. In the embodiment shown, the two reflective surfaces 50$a$ and 50$b$ are positioned rectangular towards one another and form together with the surfaces of the plate 52 an isosceles triangle. Here, the two interfering beams are generated on one plate only, being plate 52. The partial reflection (with a degree of reflectance of a view percent) takes place on the "inner" surface 52$b$ of the plate 52. By the formation of the two reflective surfaces 50$a$ and 50$b$ in one block 50 this arrangement is stable against minor maladjustments of the mirror during the tuning of the wavelength. During wavelength tuning the mirror 50 is shifted perpendicular to the surface of the plate 52 in the direction indicated by the double headed arrow P by means of a piezoelectric element. Here, too, the free spectral range (FSR) of the wavelength selective arrangement is given as $\lambda^2/(2\,nh)$. The two reflective surfaces 50$a$, 50$b$ are preferably positioned rectangular towards one another.

FIG. 5 shows a further embodiment with a prism 60 and a mirror 62 arranged parallel to that prism's base surface 66, the mirror 62 being movable relative to the base surface 66 of the prism 60 by means of a piezoelectric element in the directions of the double headed arrow 64. The distance between the front surface of the mirror 62 and the base surface 66 of the prism 60 is identified with "d" in FIG. 5.This wavelength selective outcoupling device 16''', too, is based on two-beam-interference.

Total reflection occurs on the base surface 66 of the prism 60. The prism 60 may, for example, be made of $CaF'_2$ or $MgF_2$. The radiation enters the prism 60 and a total reflection occurs on that prism's base surface 66, i. e. the angle of incidence $\alpha$ is $\geq\theta=\arcsin(1/n)$ ($\theta$ being the angle of the total reflection).

The distance d between the totally reflective base surface 66 of the prism 60 and the mirror 62 is adjusted in the direction of the arrow 64 (i. e. in the direction of the surface normals of both, the base surface 66 and the mirror 62). A variation of the optical path lengths is achieved by varying the phase of the reflection coefficient R of the totally reflective prism 60. R results from a good approximation ($\alpha=\theta$) by $R\approx 1+i(\text{st}/\cos\alpha\exp(-2\kappa d);\ |R|\approx 1)$ $\kappa=(2\pi/\lambda)s;\ s=((n\sin\alpha)^2-1)^{1/2};$ $t=4n$ (polarization perpendicular to the plane of incidence)

$t=4n$ (polarization parallel to the plane of incidence)

$\kappa$ is the attenuation coefficient of the evanescent wave, i. e. perpendicular to the totally reflective surface. The variation ΔL of the optical path length L results from (the imaginary part of R to be differentiated over d).

$$\Delta L = (2t/\cos\alpha)s^2 \exp(-2\kappa d)\Delta d$$

The fact that ΔL/Δd can be made very small (e. g. ΔL/Δd≈0, 000) enables very fine wavelength tuning.

One difficulty with the embodiment according to FIG. 5 lies in the fact that the optical path of the interference arrangement runs inside the solid body (of the prim 60) so that thermal problems may occur. On the other hand, the fact that the shifting of the mirror 62 influences the reflection coefficient R only and not the optical path itself is a big advantage. In order to achieve an evanescent wave with low attenuation (and thereby enlarging the distance d) the angle of incidence α is required to be very near the angle θ of the total reflection (s<<1).

FIG. 6 shows a modification of the embodiment according to FIG. 5 insofar as the angles at which the radiation 36 enters the prism 70 and the decoupled radiation 20 emerges from it, respectively, are in each case rectangular. Here, too, a mirror 72 is arranged parallel to the base surface 76 of the prism 70. The function of the mirror 72, which can be shifted in the directions of the double headed arrow 74 by means of a piezoelectric crystal, is analogous to the function of the mirror 62 in FIG. 5 described above. In FIG. 6 the symbol $\otimes$ identifies the optical axle of the system on the one hand and the polarization of the incident laser beam 36 on the other. The right angles are identified with the usual symbol. In this arrangement a $MgF_2$, a $MgF_2$ prism is, for example, used with $n=n_e =1,41615$ (at 248 nm). The angle of incidence α is 45° and s (see above) is 0,05.

What is claimed is:

1. Laser for the generation of narrow band radiation of high spectral purity comprising:
   a resonator;
   a laser active medium located in the resonator;
   at least one wavelength selective element located in the resonator; and
   a wavelength selective outcoupling device for coupling out radiation from the laser resonator, said wavelength selective outcoupling device being defined by a prism which is wavelength selective due to interference.

2. Laser for the generation of narrow band radiation of high spectral purity comprising:
   a resonator;
   a laser active medium located in the resonator;
   at least one wavelength selective element located in the resonator; and
   a wavelength selection outcoupling device for coupling out radiation from the laser resonator, said wavelength selective outcoupling device being defined by two geometrically non-plane-parallel oriented plates which are both partially reflective on one side thereof wherein wavelength selection by the wavelength selective outputcoupling device is due substantially to reflection between said partially reflective sides of said plates.

3. Laser for the generation of narrow band radiation of high spectral purity comprising:
   a resonator;
   a laser active medium located in the resonator;
   at least one wavelength selective element located in the resonator; and
   a wavelength selection outcoupling device for coupling out radiation from the laser resonator, said wavelength selective outcoupling device being defined by a dualreflection, retro-reflection mirror and a plate, wherein two interfering beams occur on the plate by means of partial reflection.

4. Laser for the generation of narrow band radiation of high spectral purity comprising:
   a resonator;
   a laser active medium located in the resonator;
   at least one wavelength selective element located in the resonator; and
   a wavelength selection outcoupling device for coupling out radiation from the laser resonator, said wavelength selective outcoupling device being defined by a prism which is wavelength selective due to interference, wherein the outcoupling device comprises an isosceles prism.

5. A laser according to claim 4, wherein the laser radiation impinges perpendicularly on the isosceles sides of the prism.

6. Laser for the generation of narrow band radiation of high spectral purity comprising:
   a resonator;
   a laser active medium located in the resonator;
   at least one wavelength selective element located in the resonator; and
   a wavelength selection outcoupling device for coupling out radiation from the laser resonator, said wavelength selective outcoupling device being defined by two transparent plates which are both partially reflective on one side thereof,
   wherein the two plates are arranged in an angular manner like an isosceles prism.

7. A laser according to claim 6, wherein the laser radiation impinges perpendicularly on the plates.

8. A laser according to any of claims 1 to 7, wherein the outcoupling device is wavelength selection by means of two-beam interference.

9. A laser according to any of claims 1 to 7, wherein the wavelength selected by the wavelength selective element corresponds at least approximately to the wavelength selected by the outcoupling device.

10. A laser according to any of claims 1 to 7, wherein the wavelength selective element and the outcoupling device are adjustable by means of a control device for the tuning of the wavelength.

11. A laser as recited in any of claims 1 to 7, wherein the laser is an excimer laser.

12. A laser as recited in any of claims 1 to 7, wherein the laser is an $F_2$ laser.

13. A laser according to claim 1, wherein said interference occurs between a surface of said prism and an external surface.

14. A laser according to claim 1, wherein said interference occurs between two surfaces of said prism.

15. A laser according to claim 2, further comprising a further reflecting surface optically disposed between said partially reflective sides of said plates for tuning said wavelength selective outcoupling device.

* * * * *